United States Patent [19]

Jache et al.

[11] 3,995,011

[45] Nov. 30, 1976

[54] PREPARATION OF TUNGSTEN HEXAFLUORIDE FROM HALOGEN AND HYDROGEN FLUORIDE

[75] Inventors: Albert W. Jache, Milwaukee, Wis.; Joseph L. Russell, Lorman, Miss.

[73] Assignee: Olin Corporation, New Haven, Conn.

[22] Filed: Oct. 14, 1975

[21] Appl. No.: 621,967

[52] U.S. Cl. .............................................. 423/489
[51] Int. Cl.$^2$ .......................................... C01G 41/00
[58] Field of Search ............................. 423/489, 481

[56] References Cited
OTHER PUBLICATIONS

J. H. Simons book, vol. 1, 1950, of Fluorine Chemistry", pp. 56, 112 and 113, Academic Press Inc., Pub., New York, N.Y. Copy Sc. Lib.

*Primary Examiner*—Edward Stern
*Attorney, Agent, or Firm*—F. A. Iskander; T. P. O'Day

[57] ABSTRACT

Tungsten hexafluoride is prepared by reacting selected tungsten compounds with a halogen and hydrogen fluoride at elevated temperature and pressure under substantially anhydrous conditions in the substantial absence of air.

4 Claims, No Drawings

PREPARATION OF TUNGSTEN HEXAFLUORIDE FROM HALOGEN AND HYDROGEN FLUORIDE

BACKGROUND OF THE INVENTION

1. Field of the Invention

The present invention relates to a process for preparing tungsten hexafluoride from selected tungsten compounds, a halogen and hydrogen fluoride.

2. Prior Art

Tungsten hexafluoride is used when plating with tungsten, in certain welding operations, and for numerous other known uses. It has heretofore been prepared directly by the reaction of elemental fluorine with metallic tungsten, a process which is prohibitively expensive, requires highly skilled personnel and specialized equipment.

Tungsten hexafluoride may also be prepared by the reaction set forth in U.S. Pat. No. 3,185,543, namely, by reacting tungsten with NOF 3HF complex, but this is an indirect route since the NOF 3HF complex must first be prepared by reacting nitrosyl chloride with HF.

U.S. Pat. No. 3,373,000 to Jache et al sets forth a process for preparing tungsten hexafluoride from chlorine monofluoride and discloses other interhalogen compounds which may be employed as fluorinating agents. Each of these routes is also indirect in that the fluorinating agent is not a readily available commodity chemical and must therefore be prepared as part of the overall process of preparing tungsten hexafluoride. In the case of chlorine monofluoride, U.S. Pat. No. 3,451,775 sets forth a process by which this interhalogen may be prepared.

It is extremely desirable to avoid the indirect routes described above, to avoid the use of elemental fluorine, and to find a direct route to tungsten hexafluoride which utilizes inexpensive and readily available starting materials.

It has now been found that these and other advantages may be attained by reacting a selected tungsten compound, a halogen and hydrogen fluoride at elevated pressure and at a temperature of 150° C.–150° C. under anhydrous conditions in the absence of air.

SUMMARY OF THE INVENTION

Thus, the present invention comprises a process for preparing tungsten hexafluoride in which a tungsten compound, a halogen and hydrogen fluoride are reacted together at elevated temperature and pressure in the absence of water or air.

The process utilizes only readily available and inexpensive starting materials and converts tungsten directly to the hexafluoride without preparation or isolation of intermediates. The intermediate halides, however, may be employed as a starting material if desired.

DETAILED DESCRIPTION

In accordance with the present invention a tungsten compound selected from the group consisting of metallic tungsten and tungsten halides having 2–4 atoms of halogen per atom of tungsten, preferably in a finely divided state, is reacted directly with a selected halogen and hydrogen fluoride. The reaction is conducted in an autoclave or high pressure reactor which is resistant to the corrosive effects of hydrogen fluoride, the halogen and tungsten hexafluoride. Monel is suitable and it is preferable to conduct the reaction in the absence of air.

The reaction may be conducted batchwise as shown in the examples or continously by passing a mixture of the halogen and hydrogen fluoride over the tungsten compound, condensing out product and recycling excess hydrogen fluoride and chlorine, if any.

The reaction according to the present invention is substantially as follows:

$$W + 3X_2 + 6HF \rightarrow WF_6 + 6HX$$
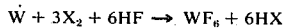

wherein X is the selected halogen. The preferred halogens are chlorine or bromine. Thus, the by-product is either hydrogen chloride or hydrogen bromide respectively. The halogen may be supplied as a liquid or gas as desired. If the tungsten halide is used, for example, tungsten chloride, the reaction proceeds according to the equation $$WCl_2 + 2Cl_2 + 6HF \rightarrow WF_6 + 6HCl$$
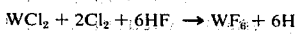

Thus, this embodiment merely requires 1 less mole of chlorine to be supplied to the reactor.

In accordance with the stoichiometry shown above, at least 3 moles of halogen and 6 moles of hydrogen fluoride should be employed per mole (gm. atom) of tungsten if good yields are to be attained. Preferably, excess halogen and hydrogen fluoride is preferred, for example, 3–6 moles of halogen and 6–10 moles of hydrogen fluoride per mole of tungsten.

The reaction is conducted at a temperature of about 150° C. and suitably up to the temperature at which tungsten hexafluoride decomposes or the equipment becomes subject to excessive corrosive attack, probably about 500° C. A preferred range would be about 150° C. to about 450° C.

The reaction when run batchwise is conducted for a time sufficient to substantially complete the reaction. Since reaction kinetics are temperature dependent the reaction time will vary with variations in the reaction temperature, proceeding to completion faster at higher temperatures than at lower temperatures. In a continuous process it may be more advantageous to minimize retention time in the reactor and recover and recycle the halogen and hydrogen fluoride. Thus, reaction time may vary widely from about 10 minutes up to about 25 hours with a preferred range being from about 15 minutes up to about 15 hours.

The reaction is conducted in a closed reactor at elevated pressure and the pressure generated therein is preferably autogenous but higher or lower pressures may be utilized as desired.

The following examples are illustrative of the practice of the invention described above.

EXAMPLE 1

Five grams of metallic tungsten, 10 grams of HF and 8 grams of $Cl_2$ were loaded into a 150 ml. Monel cylinder. The tungsten was weighed into the bottle, and the $Cl_2$ and HF were vacuum distilled in from an all meta vacuum manifold. The bottle and its contents were then heated in an oven at 200° C. for 20 hours. The bottle was then cooled to room temperature. Fractions of the volatile species were taken in an IR 10 cm. cell equipped with AgCl cell windows. IR spectra were recorded on a Beckman IR-12.

The spectra revealed two weak narrow bands at 1480 and 1380 cm$^{-1}$. A third band (strong) was recorded at 712 cm$^{-1}$. Additional bands observed were at 1030cm$^{-1}$ ($SiF_4$) and at 795 cm$^{-1}$.

The bands at 712, 1380, and 1480$^{-1}$ were those expected of $WF_6$.

The volatile species were then hydrolyzed in strong and weak NaOH solutions. The hydrolysis produced a clear solution in strong base, but a yellow precipitate, preasumably $WO_3$, in weak base. The yellow solid dissolved in strong base to give a clear solution, and when acidified gave a positive test for tungsten.

EXAMPLE 2

Metallic tungsten (21.23 g, 0.1155 moles) were loaded into a passivated Monel cylinder. The cylinder was evacuated and a slight excess over the stoichiometric amount of chlorine and HF were distilled in. The cylinder and contents were placed in an oven and heated to 200° C. for 17 hours. A weight loss of 1.8 g occurred during the reaction period. The unreacted volatiles and by-products of the reaction were fractioned off at −34° C. by dynamic vacuum. The cylinder was then warmed in a water bath to 50° C. and $WF_6$ collected in a Kel-F vessel cooled at the bottom with liquid nitrogen. $WF_6$ was identified by IR spectrum, freezing point, vapor pressure and molecular weight measurements. Yield based tungsten converted was 74.5%. In hand yield was 23.9%.

EXAMPLE 3

Chlorine (24.57 g, 34.65 moles) and HF (13.86 g, 0.6930 moles) were added to a Monel cylinder containing 10.62 g (.5775 moles) metallic tungsten. The cylinder and contents were heated to 200° C. for 2 hours and recovered as described in Example 2. The yield of $WF_6$ was 92% of theoretical based on tungsten charged to the cylinder.

What is claimed is:
1. A process for preparing tungsten hexafluoride, comprising:
reacting together under substantially anhydrous conditions and in the substantial absence of air, at elevated pressure and at a temperature of about 150° C. to about 500° C.:
   i. a tungsten reactant selected from the group consisting of metallic tungsten, tungsten chlorides having 2–4 chlorine atoms per atom of tungsten and tungsten bromides having 2–4 bromine atoms per atom of tungsten;
   ii. at least about 3 moles of halogen per mole of tungsten atoms, said halogen being selected from the group consisting of chlorine and bromine; and,
   iii. at least about 6 moles of hydrogen fluoride per mole of tungsten atoms.
2. The process of claim 1 wherein said halogen is chlorine.
3. The process of claim 1 wherein said tungsten reactant is metallic tungsten.
4. The process of claim 3 wherein said halogen is chlorine.

* * * * *